United States Patent [19]

Prentice

[11] 4,078,124
[45] * Mar. 7, 1978

[54] LAMINATED NON-WOVEN SHEET

[75] Inventor: James S. Prentice, Joliet, Ill.

[73] Assignee: Exxon Research & Engineering Co., Linden, N.J.

[ * ] Notice: The portion of the term of this patent subsequent to Feb. 6, 1990, has been disclaimed.

[21] Appl. No.: 304,282

[22] Filed: Nov. 6, 1972

Related U.S. Application Data

[60] Continuation-in-part of Ser. No. 864,994, Oct. 9, 1969, Pat. No. 3,715,251, and Ser. No. 291,127, Sep. 21, 1972, Pat. No. 3,795,571, which is a division of Ser. No. 864,994.

[51] Int. Cl.² ................ B32B 7/14; B32B 31/00; D04H 1/00
[52] U.S. Cl. .................................. 429/144; 156/290; 156/291; 156/306; 428/198; 428/288; 428/296; 429/142
[58] Field of Search ............... 161/148, 150, 156, 157, 161/170; 156/290, 306, 272, 273, 244, 62.8, 291; 136/143, 145, 146; 428/296, 286, 288, 198; 429/142, 144

[56] References Cited

U.S. PATENT DOCUMENTS

| | | | |
|---|---|---|---|
| 2,464,301 | 3/1949 | Francis | 161/150 X |
| 3,097,975 | 7/1963 | Horn et al. | 136/146 X |
| 3,344,013 | 9/1967 | Fahrbach | 161/150 |
| 3,615,865 | 10/1971 | Wetherell | 136/146 |
| 3,715,251 | 2/1973 | Prentice | 161/150 X |

Primary Examiner—Lorraine T. Kendell
Attorney, Agent, or Firm—David A. Roth

[57] ABSTRACT

A laminated non-woven sheet battery separator is made from non-woven mats of melt-blown thermoplastic polymer fibers. The non-woven sheets may be produced by either point welding or using adhesives to laminate at least one non-woven mat having a high strip tensile strength to at least one non-woven mat having a high tear resistance so that the sheets have both high strip tensile strength and high tear resistance.

6 Claims, 5 Drawing Figures

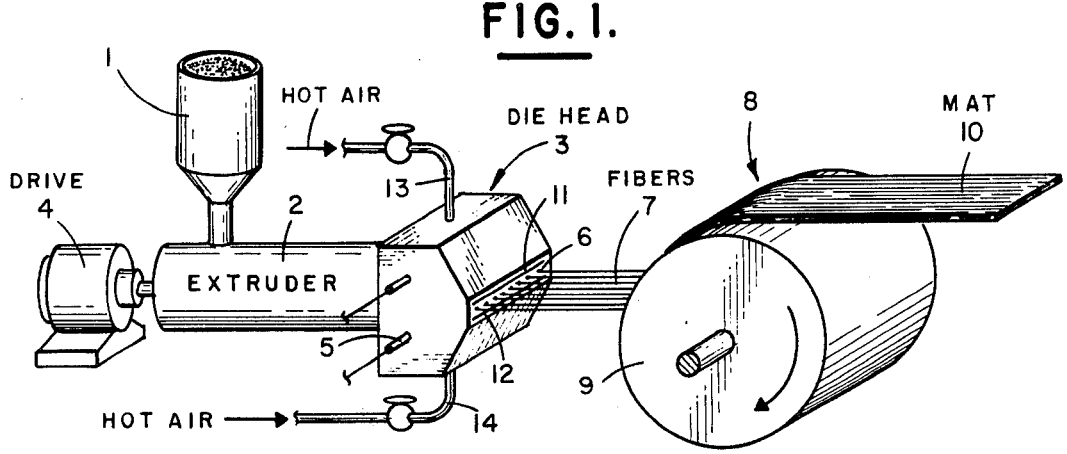
FIG. 1.
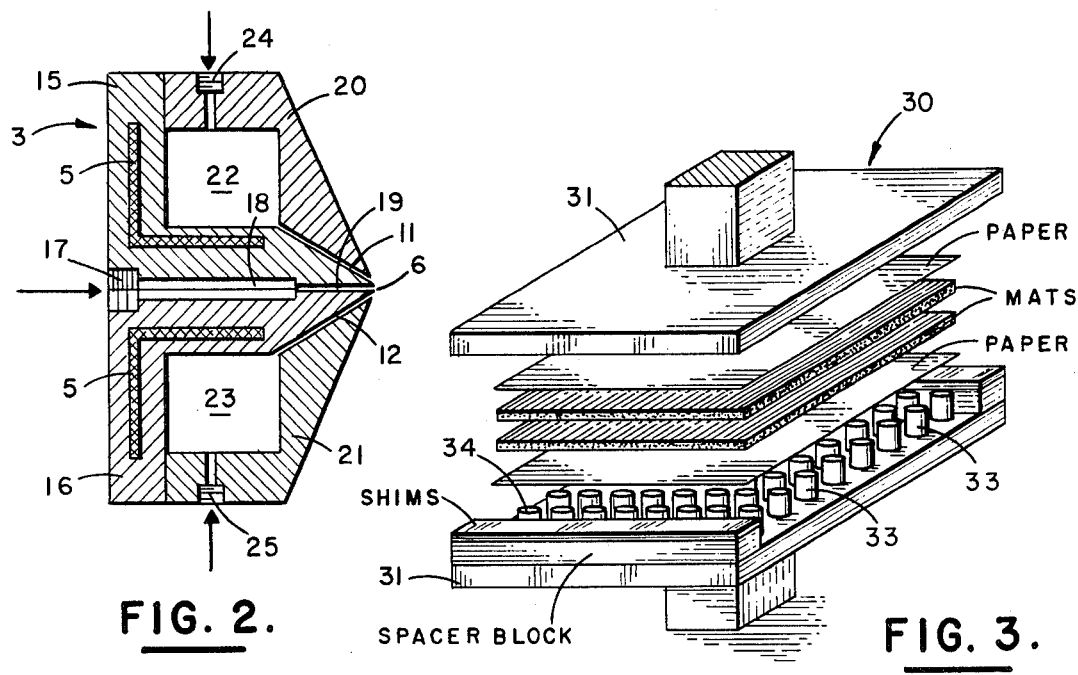
FIG. 2.
FIG. 3.
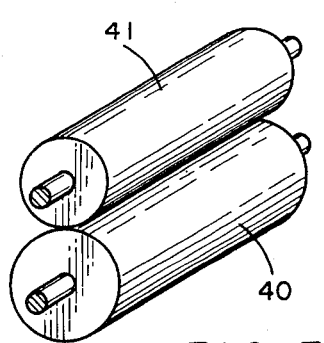
FIG. 3A.
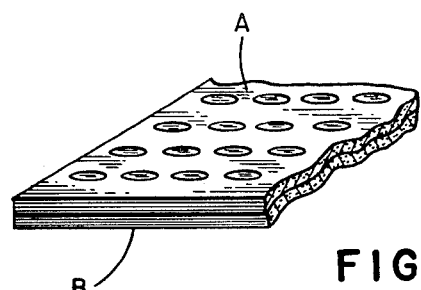
FIG. 4.

LAMINATED NON-WOVEN SHEET

This application is a continuation-in-part of my co-pending applications U.S. Ser. No. 864,994, filed Oct. 9, 1969, now U.S. Pat. No. 3,715,251 and its Division U.S. Ser. No. 291,127, filed Sept. 21, 1972, now U.S. Pat. No. 3,795,571.

BACKGROUND OF THE INVENTION

1. Field of the Invention

The present invention is directed to laminating a plurality of non-woven mats of melt-blown thermoplastic polymer fibers to produce a non-woven sheet battery separator. The non-woven sheets may be produced by either point welding or using adhesives.

2. Prior Art

U.S. Pat. No. 3,341,394; British Patent 1,055,187.

SUMMARY OF THE INVENTION

This invention is directed to a laminated, non-woven sheet battery separator made from non-woven mats of melt-blown thermoplastic polymer fibers. The process of the present invention comprises laminating one or more non-woven mats made of thermoplastic polymer fibers and having a high strip tensile strength to one or more non-woven mats of the same thermoplastic polymer fibers and having a high tear resistance to obtain both high strip tensile strength and high tear resistance in the laminated non-woven sheet. The lamination may be carried out either by point welding or using an adhesive to laminate the non-woven mats. The battery separators are assembled in batteries between the positive and negative plates.

BRIEF DESCRIPTION OF THE DRAWINGS

FIG. 1. is a schematic view of the overall melt-blowing process;

FIG. 2 is a detailed view in longitudinal cross-section of a die which may be used in the melt-blowing process;

FIG. 3 is a schematic view of a press used in fuse-bonding a non-woven mat or point welding two mats together;

FIG. 3A is a schematic view of calendar rolls which may be used instead of a press; and FIG. 4 is a schematic view of a laminated non-woven sheet according to the present invention.

DESCRIPTION OF THE PREFERRED EMBODIMENTS

Referring to FIG. 1 of the drawings, a thermoplastic polymer is introduced into a pallet hopper 1 of an extruder 2. The thermoplastic polymer is forced through the extruder 2 into a die head 3 by a drive 4. The die head 3 may contain heating plates 5 which may control the temperature in the die head 3. The thermoplastic polymer is then forced out of a row of die openings 6 in the die head 3 into a gas stream which attenuates the thermoplastic polymer into fibers 7 which are collected on a moving collecting device 8 such as a drum 9 to form a continuous mat 10. The gas stream which attenuates the thermoplastic polymer is supplied through gas jets 11 and 12 respectively, which are seen more clearly in FIG. 2. The gas slots 11 and 12 are supplied with a hot gas, preferably air, by gas lines 13 and 14 respectively.

The process may be further understood by considering the details of the die head 3 which is more fully set forth in FIG. 2. The die head 3 is made up of upper die plate 15 and a lower die plate 16. The thermoplastic polymer is introduced in the back of the die plates 15 and 16 through an inlet 17 as it is forced through the extruder 2 into the back of the die head 3. The thermoplastic polymer then goes into a chamber 18 between the upper and lower die plates 15 and 16 respectively. The facing of the die plate 16 may have milled grooves 19 which terminate in the die openings 6. It is understood, of course, that the milled grooves may be in the lower die plate 16, in the upper die plate 15, or that grooves may be milled in both plates 15 and 16. Still further, if a single plate is used in place of the upper and lower die plates, the grooves may be drilled to produce the die openings 6. An upper gas cover plate 20 and a lower gas cover plate 21 are connected to the upper die plate and lower die plate 15 and 16 respectively to provide an upper air chamber 22 and a lower air chamber 23 which terminate in the gas slots 11 and 12 respectively. The hot gas is supplied through inlet 24 in upper gas cover plate 20 and inlet 25 in lower gas cover plate 21. Suitable baffling means (not shown) may be provided in both the upper air chamber 22 and lower air chamber 23 to provide a uniform flow of air through the gas slots 11 and 12 respectively. The die head 3 may contain heating means 5 for heating both the thermoplastic polymer and air in the die head 3.

The characteristics of the non-woven thermoplastic polymer mats produced by the melt-blowing process will vary considerably depending upon the particular process conditions used. The characteristics of the non-woven thermoplastic polymer mats are affected in large part by the air flow rates used in the melt-blowing process and the distance of the take-up device from the die openings in the die head. These effects were noted as melt-blown non-woven mats were attempted to be made having high strip tensile strength and high tear resistance. However, both high strip tensile strength and high tear resistance were found to be unobtainable in a single melt-blown non-woven thermoplastic polymer mat. Inherent in the present invention is the recognition that to obtain both high strip tensile strength and high tear resistance in a non-woven thermoplastic polymer sheet, mats have to be laminated one to another. Specifically, this invention involves laminating mats having a high strip tensile strength to mats having a high tear resistance.

In the melt-blowing process, when the air rates are high and the pounds of air to pounds of thermoplastic polymer extruded through the die head are high (suitably greater than about 140, desirably 150, and preferably in excess of 200 lbs. air/lbs. of polymer for polypropylene) the thermoplastic polymer fibers in the non-woven mat are such that generally the mat has a higher zero span tensile strength. The fibers at the higher air rates appear to be drawn, and are much finer fibers as evidenced by their small diameters, which range from 1 to 10 microns.

One of the other process variables in the melt-blowing process which materially affects the characteristics of the non-woven thermoplastic polymer mat is the distance of the take-up device from the die openings and the die head. When the collecting device is between 1 to 6 inches from the die openings, there is evidence of considerable self-bonding of the fibers as they are laid down in the non-woven mat. At distances greater than 6 inches between the die openings and collector device, some self-bonding still occurs but the amount of self-bonding decreases with distance. The term "self-bonding" herein means thermal bonding of one fiber to another in the melt-blowing process as the non-woven thermoplastic polymer mats are formed. The strip tensile strength of the thermoplastic polymer mats as produced by the melt-blowing process is greatest in those mats having the highest degree of self-bonding, whereas the self-bonding decreases, the mat is comprised essentially of entangled fibers and the strip tensile strength materially decreases. Another factor in the strip tensile strength of the melt-blown mat is the tensile strength of the fiber itself. The tensile strength of the fibers in the melt-blown non-woven mat are found by measuring the zero span tensile strengths of the mats, a measurement which utilizes the same general procedure employed to obtain the strip tensile strength of the mats. The procedure for obtaining strip tensile strength and zero span tensile strength are those in ASTM procedure D-828-60, with the exception that to measure the strip tensile strength the clamps are set apart at a distance of 2 inches using an elongation rate of 250%/min., but to measure the zero span tensile strength, the clamps are not separated by any distance. In both instances, the results are reported in meters, the unit resulting when the force necessary to break the mat, measured in grams, is divided by the width of the sample, measured in meters, all of which is divided by the basis weight of the sample in terms of grams/meter$^2$.

The process variables used in the melt-blowing process to obtain mats of high strip tensile strength result in low tear resistances in those mats. Correspondingly, when a non-woven mat of high tear resistance is produced, the mat has a low strip tensile strength. The conditions for producing a mat of high tear resistance generally require that the take-up device be positioned at a distance greater than 8 inches from the die openings so that substantial entanglement of the fibers occur rather than a large degree of self-bonding. Furthermore, it is desirable to operate at lower air rates and, accordingly, much lower air to polymer rates (generally less than about 50 for polypropylene), to obtain a mat in which the fibers are of a larger diameter—within the range of 10 to 40 microns, usually 15 to 25 microns. The non-woven mats made of these larger diameter thermoplastic polymer fibers, collected as entangled fibers and containing some self-bonding, have higher tear resistances than the non-woven mats made of interentangled smaller diameter fibers. The tear resistance of the non-woven mat is measured by a standard Elmendorf tear strength tester in accordance with ASTM procedure D-689-62.

For use in the laminated sheet of the present invention, the strip tensile strengths of the non-woven mats that are formed by the melt-blowing process are generally lower than desired even though the zero span tensile strength of the mats may be quite high. Accordingly, the strip tensile strengths are improved by treating the non-woven mats by a fuse-bonding process. The fuse-bonding process may be accomplished by applying a spaced pattern of heat to the mat to melt discrete portions of the mat and fuse a portion of the fibers in the mat. Alternatively, the fuse-bonding may be effected by a general fusion of the fibers by applying an unbroken pattern of heat to the mat. In the fuse-bonding process, sufficient pressure is applied to prevent shrinkage of the fibers in the non-woven mat as indicated by measuring the size of the mat before and after fuse-bonding and as determined by a lack of decrease in the zero span tensile strength of the non-woven mat.

Referring to FIG. 3, a heated press 30 may be used in the fuse-bonding process to increase the strip tensile strengths of the melt-blown non-woven mats. The press 30 comprises a plate 31 and a plate 32. The plate 31 has a plurality of spaced apart projections 33 which terminate in flat lands 34 that are spaced in a design or pattern. The spacing of the projections 33, the total surface of the flat lands 34 and the pattern of the projections 33 of the plate 31 will partially determine the degree to which the fibers of the non-woven mats are point bonded. The spacing of the projections 33 and the pattern may vary greatly although suitable patterns are rectilinear or diagonal grids. Suitable spacing for the projections 33 are between about 1/16 inch and ¼ inch. The depth to which the projections 33 will penetrate the non-woven sheet may be controlled by the use of spacers or shims placed between plate 31 and plate 32. The plate 32 may have a flat surface which would come in contact with the lands 34 of the projections 33 of plate 31 or the plate 32 may also have projections which are aligned with the projections of plate 31 so that the lands of the projections of plate 32 would contact the lands 34 of the projections of plate 31. To obtain higher increases in the strip tensile strengths of the non-woven mats, the deeper penetration of the projections 33 into the non-woven mats is desired. Each of the plates 31 and 32 may be heated independently so that the temperatures of the plates are not necessarily the same.

In the fuse-bonding process of the non-woven mats, it is convenient to use spacer sheets between the non-woven mats and the plates 31 and 32 of the press to prevent the non-woven mat from sticking to the plates either during or subsequent to the fuse-bonding operation. Suitable spacer sheet material which may be employed include insulating materials such as tissue paper, ordinary paper and the like or heat conducting materials such as aluminum foil and the like. The conducting spacer sheets are preferred since the additional heat increases the fusing of the fibers in the fuse-bonding process.

For the continuous production of the non-woven mats of improved higher strip tensile strengths, it is advantageous to carry out the fuse-bonding process by calendering the non-woven mats under heating conditions which effect fiber-to-fiber fusion under pressure sufficient to prevent shrinkage of the fibers of the non-woven mat. Referring to FIG. 3A, calender rolls 40 and 41 are shown which may be employed instead of the press 30. The calender roll 40 may have projections which terminate in flat lands which may be patterned in a wide variety of forms, such as a diagonal grid (not shown). In the calendering operation to carry out the fuse-bonding, spacer sheets may also be used to prevent the non-woven mats from sticking to the calender rolls.

According to the present invention, a non-woven laminated sheet is produced from at least one mat of thermoplastic polymer fibers having a high strip tensile strength and at least one mat of the same thermoplastic polymer fiber having a high tear resistance, so that the laminated sheet has both a high strip tensile strength and high tear resistance. The lamination may be accomplished by using an adhesive or by a point-welding process. The lamination is carried out to an extent that the melt-blown non-woven mat having the high strip tensile strength and the melt-blown non-woven mat having the high tear resistance each contribute their properties to the non-woven laminated sheet in the approximate proportion of the weight fractions of each of the melt-blown non-woven mats.

The use of an adhesive to accomplish the lamination is preferred when a non-woven laminated sheet having low delamination characteristics is desired. Suitable adhesives for laminating one melt-blown non-woven mat to another are such contact cements as the nitrile, SBR or polyisobutylene rubber types. When using an adhesive, usually the adhesive is applied to one surface of one of the melt-blown non-woven mats, the other mat is then placed in contact with the adhesive coating, and the mats are pressed together. Of course, the adhesive may be applied to surfaces of each of the melt-blown non-woven mats and the coated surfaces placed in contact with one another for accomplishing the lamination. After the non-woven mats are coated with the adhesive and the mats are contacted one with the other, they may be passed through a plain surfaced calender roll to compress them together to form the non-woven laminated sheet of the present invention.

An alternative method of laminating the melt-blown non-woven mats to form the non-woven laminated sheets of the present invention is to point weld the mats together. The point-welding process is essentially the same as the process for fuse-bonding a single mat except that in the point-welding process there are at least two mats present, at least one melt-blown non-woven mat having a high strip tensile strength and at least one other melt-blown non-woven mat having a high tear resistance. Referring to FIG. 4, the non-woven laminated sheet of the present invention is illustrated with two mats point-welded together: the non-woven mat A, having a high strip tensile strength, and the other melt-blown non-woven mat B, having a high tear resistance. The point-welding process may be accomplished either by using a press, such as illustrated in FIG. 3, or by calendering. The lamination of the sheets is accomplished in the point-welding process by fusing fibers in each of the melt-blown mats at the interface of the superimposed mats. Shims or spacers (not shown) may be used to permit the projections of either the press or the calender rolls to penetrate to a depth permitting fusion of the fibers at the interface of the melt-blown non-woven mats.

In the point-welding process, the melt-blown non-woven mat B having the high tear resistance is most subject to change in its properties by a heating of the non-woven mat to high temperatures. Accordingly, it is preferred that the non-woven mat B having the high tear resistance be placed in contact with the projections of the press or calender rolls instead of in contact with the flat press plate or calender roll, and that the temperature of the plate of the press or the calender rolls having the projections be operated at lower temperatures than the flat press plate or calender roll. In the point-welding process, spacer sheets may be used and in this operation the spacer sheets which prevent the sticking of the non-woven mat to the press plate or calender rolls may be either the same or different materials. Accordingly, a heat insulating material such as a paper or tissue paper may be used in contact with the high tear resistance non-woven mat B, whereas the spacer sheet between the non-woven mat A having a high strip tensile strength may be a conducting material such as aluminum foil. These variations are pointed out merely to emphasize that the physical properties of the melt-blown non-woven mats are attempted to be preserved at a high level in the lamination process.

The present invention is illustrated with non-woven mats formed of melt-blown polypropylene fibers. However, other thermoplastic polymer fibers may be used in the present invention and include other polyolefins such as polyethylene; polyesters, including poly(methylmethacrylate) and poly(ethylene terephthate); polyamides such as poly(hexamethylene adipamide), poly($\omega$-caproamide) and poly(hexamethylene sebacamide); polyvinyls such as polystyrene; and other polymers such as polytrifluorochloroethylene. The specific melt-blown non-woven mats used in the examples which follow are illustrative of the present invention and utilize the non-woven mats of melt-blown polypropylene fibers produced in accordance with the conditions set forth in Table I, which follows. The melt-blowing process used is that which was illustrated in FIGS. 1 and 2 of the drawings with the specific operating conditions as set forth in Table I. The specific non-woven mat characteristics are also set forth in Table I as to basis weight, zero span tensile strength and the degree of uniformity of the mat in terms of the zero span tensile strength by the ratio of the cross direction to machine direction (CD/MD).

TABLE I

| Mat Nos. | A | B | C | D | E | F | G | H | I |
|---|---|---|---|---|---|---|---|---|---|
| Polypropylene MFR | 0.6 | 0.6 | 0.6 | 0.6 | 30 | 30 | 30 | 0.6 | 0.6 |
| Extruder Temperature (° F.) | 692 | 653 | 702 | 720 | 700 | 690 | 685 | 642 | 640 |
| Die Temperature (° F.) | 637 | 630 | 643 | 642 | 635 | 631 | 630 | 610 | 600 |
| Polymer Rate (gm/min) | 8.4 | 8.0 | 8.0 | 8.0 | 8.1 | 8.1 | 8.1 | 8.2 | 8.2 |
| Air Flow (lb/min) | 4.30 | 3.85 | 3.78 | 4.24 | 4.06 | 4.05 | 3.90 | 4.2 | 4.2 |
| Lb Air/ Lb Polymer | 232 | 218 | 214 | 240 | 227 | 227 | 218 | 233 | 233 |
| Screen Distance (in) | 4.0 | 6.0 | 6.0 | 6.0 | 4.0 | 4.0 | 4.0 | 4.0 | 4.0 |
| Mat Characteristics | | | | | | | | | |
| Basis Weight (gm/m$^2$) | 56 | 58 | 58 | 66 | 50 | 47 | 48 | 70 | 50 |
| Zero Span Tensile | 6130 | 4580 | 6440 | 5340 | 5230 | 5920 | 5640 | 5600 | 5490 |
| CD/MD | 0.64 | 0.57 | 0.62 | 0.76 | 0.67 | 0.61 | 0.62 | — | 0.75 |
| | J | K | L | M | N | O | P | Q | |
| Polypropylene MFR | 0.6 | 0.6 | 0.6 | 0.6 | 3.5 | 3.5 | 33.0 | 33.0 | |
| Extruder Temperature (° F.) | 691 | 691 | 690 | 690 | 647 | 650 | 580 | 585 | |
| Die Temperature (° F.) | 634 | 631 | 633 | 632 | 609 | 602 | 533 | 525 | |
| Polymer Rate (gm/min) | 8.4 | 8.4 | 8.4 | 8.4 | 7.0 | 7.0 | 8.0 | 8.5 | |
| Air Flow | 4.36 | 4.32 | 4.18 | 4.15 | 3.35 | 3.36 | 0.67 | 0.82 | |

TABLE I-continued

| (lb/min) Lb Air/ Lb Polymer | 235 | 233 | 226 | 224 | 217 | 218 | 38 | 44 |
|---|---|---|---|---|---|---|---|---|
| Screen Distance (in) | 3.0 | 6.0 | 8.0 | 12.0 | 4.0 | 4.0 | 18.0 | 12.0 |
| Mat Characteristics | | | | | | | | |
| Basis Weight (gm/m²) | 59 | 51 | 54 | 50 | 131 | 70 | 71 | 35 |
| Zero Span Tensile | 5830 | 4820 | 4730 | 4730 | 4930 | 5383 | — | — |
| CD/MD | 0.59 | 0.78 | 0.86 | 0.82 | 0.70 | 0.69 | — | — |

EXAMPLES 1-15

Laminated non-woven sheets of the present invention are illustrated by the examples set forth in Table II hereinafter. The laminated sheets are prepared by the lamination of a melt-blown non-woven mat of polypropylene fibers having high strip tensile strength to a melt-blown non-woven mat of polypropylene fibers having high tear resistance. The lamination is carried out either by point-welding the mats together (Examples 1-12) or by using an adhesive (Examples 13-15).

The non-woven mats of polypropylene fibers having high strip tensile strength are prepared either by point-bonding (Examples 1-9) or by calendering (Examples 10-15) under conditions as set forth in Table II. The point-bonding or calendering is carried out on a non-woven mat, identified by a capital letter, which was made under the conditions of Table I. The non-woven mats after being treated to obtain the high strip tensile strength were then laminated to melt-blown non-woven mats having high tear resistance (Mats P and Q of Table I). The resulting laminated non-woven sheet properties are also set forth in Table II.

In Examples 1-9 the melt-blown non-woven mats (Mats A-D of Table I) have the strip tensile strength improved by fuse-bonding utilizing a press wherein the temperatures of the plates of the press are separately controlled. The temperatures of the plates are set forth in Table II, the upper plate being a smooth surfaced plate and the lower plate having projections arranged in a spaced pattern. In Examples 1-4 the non-woven mats produced in accordance with the conditions in Table I were fuse-bonded to improve the strip tensile strengths of the mat by using two spacer sheets of tissue paper between the non-woven mat and the plate having the projections and one spacer sheet of aluminum foil between the non-woven mat and the smooth surfaced plate of a press. In Example 5 a spacer sheet of aluminum foil was placed on each side of the non-woven mat in the fuse-bonding. In Examples 6-9 a single spacer sheet of aluminum foil was used between the non-woven mat and the smooth surfaced plate of the press and a single spacer sheet of tissue paper was used between the non-woven mat and the plate having projections. In each of Examples 1-9 the fuse-bonding was carried out for 10 seconds with the plates being closed so that there was a spacing of 0.005 inches between the lands of the projections and the smooth surfaced plate. The spacing is provided by a 0.005 inch shim between the plates.

The non-woven mats (Mats E-I of Table I) in Examples 10-15 are calendered to improve the high strip tensile strength of the mats. The non-woven mats are pressed through heated calendering rolls at a rate of 20 feet per minute under a roller pressure of 700 pli at calender roll temperatures as set forth in Table II.

In Examples 1-12 the laminated non-woven sheet was made by the point-welding process. The same press was employed in the point-welding process as was used to accomplish the fuse-bonding of a single non-woven mat to improve strip tensile strength. The temperatures of the plates of the press are set forth in Table II. In Examples 1-4 the high strip tensile strength mat was placed on the lower plate and the high tear resistance mat was contacted by the upper plate. Tissue paper was used as the spacer sheets in all instances. In Examples 5-12 the high tear resistance mat was placed on the lower plate and the upper plate contacted the high strip tensile strength mat. Again, tissue paper was used as the spacer sheets. In each of Examples 1-12 the point welding was carried out for 10 seconds. In Examples 1-6, the plates were closed to a spacing of 0.005 inches; in Examples 7-9, a spacing of 0.006; and in Examples 10-12, a spacing of 0.008 inches, between the smooth surfaced plate and the lands of the projections of the other plate. The spacings were accomplished by the use of shims.

In Examples 13-15 an adhesive was used to form the laminated non-woven sheet. A polyisobutylene rubber contact cement No. BW23R4-75680A manufactured by Polymer Industries, Inc. of Springdale, Connecticut, was applied to opposed surfaces of the high strip tensile strength mat and/or the high tear resistance mat and the opposed surfaces were contacted to adhere the two mats one to another.

The results of Examples 1-15 are presented in Table II.

TABLE II

| EXAMPLE NOS. | 1 | 2 | 3 | 4 | 5 |
|---|---|---|---|---|---|
| IMPROVE STRIP TENSILE STRENGTH | | | | | |
| Mats | A | B | C | D | A |
| Press Plate Temperatures | | | | | |
| Upper (° F.) | 285 | 292 | 290 | 291 | 290 |
| Lower (° F.) | 303 | 308 | 295 | 298 | 298 |
| LAMINATION CONDITIONS | | | | | |
| Mats | A'* + P | B' + P | C' + P | D' + P | A' + P |
| Point-Welding Press Temperatures | | | | | |
| Upper (° F.) | 245 | 248 | 260 | 280 | 275 |
| Lower (° F.) | 285 | 287 | 275 | 275 | 245 |
| LAMINATED SHEET PROPERTIES | | | | | |
| Tensile (m) | 3789 | 4219 | 3985 | 3928 | 4050 |
| Tear Resistance (dm²) | >714 | 562 | 421 | 773 | 597 |
| EXAMPLE NOS. | | 6 | 7 | 8 | 9 |

TABLE II-continued

| IMPROVE STRIP TENSILE STRENGTH | | | | |
|---|---|---|---|---|
| Mats | B | B | C | C |
| Press Plate Temperatures | | | | |
| Upper (° F.) | 297 | 295 | 300 | 298 |
| Lower (° F.) | 288 | 290 | 290 | 288 |
| LAMINATON CONDITIONS | | | | |
| Mats | B' + P | B' + P | C' + P | C' + P |
| Point-Welding Press Temperatures | | | | |
| Upper (° F.) | 303 | 300 | 300 | 301 |
| Lower (° F.) | 227 | 230 | 231 | 230 |
| LAMINATED SHEET PROPERTIES | | | | |
| Tensile (m) | 4160 | 4077 | 5125 | 4794 |
| Tear Resistance (dm$^2$) | 579 | 860 | 463 | 584 |
| EXAMPLE NOS. | | 10 | 11 | 12 |

| IMPROVE STRIP TENSILE STRENGTH | | | |
|---|---|---|---|
| Mats | E | F | G |
| Calender Roll Temperatures | | | |
| Upper (° F.) | 300 | 305 | 305 |
| Lower (° F.) | 250 | 250 | 250 |
| LAMINATION CONDITIONS | | | |
| Mats | E' + P | F' + P | G' + P |
| Point-Welding Press Temperatures | | | |
| Upper (° F.) | 278 | 280 | 275 |
| Lower (° F.) | 225 | 240 | 240 |
| LAMINATED SHEET PROPERTIES | | | |
| Tensile (m) | 4268 | 4218 | 4474 |
| Tear Resistance (dm$^2$) | 796 | 641 | 930 |
| EXAMPLE NOS. | 13 | 14 | 15 |

| IMPROVE STRIP TENSILE STRENGTH | | | |
|---|---|---|---|
| Mats | H | I | H |
| Calender Roll Temperatures | | | |
| Upper (° F.) | 305 | 305 | 310 |
| Lower (° F.) | 250 | 250 | 255 |
| LAMINATION CONDITIONS | | | |
| Mats | H'** + P''' | I'** + P'' | H' + Q' |
| Adhesive | — | — | — |
| LAMINATED SHEET PROPERTIES | | | |
| Tensile (m) | 4685 | 5061 | 5109 |
| Tear Resistance (dm$^2$) | >952 | >513 | 903 |

*Prime indicates non-woven mat after treatment to improve strip tensile strength as indicated in specific example.
**Mat calendered three times at indicated temperatures.
'Mat Q calendered at room temperature, 700 pli, 20 ft/min.

Table II shows that laminated non-woven sheets having both a high strip tensile strength and a high tear resistance are made from a high strip tensile strength melt-blown non-woven mat and a high tear resistant melt-blown non-woven mat. The non-woven sheets may be produced having strip tensile strengths exceeding 4000 meters and tear resistances in excess of 400 dm$^2$. The highest tear resistances and strip tensile strengths were attained in the laminated non-woven sheets when calendering was used to impart high strip tensile strength to a melt-blown non-woven mat and when an adhesive was used to unite the mats making up the laminate, and this is the preferred way to form the laminated non-woven sheets, especially when a high peel strength or resistance to delamination is desired. The point-welded laminated non-woven sheets had a very low peel strength of about 0.5 lb/inch, and were embossed with the imprint of the plate. On the other hand, the adhesive laminates had smooth surfaces and a very high peel strength; the high tear layer yielded before delamination of the layers occurred.

EXAMPLES 16-20

In these examples, Examples 16-20 illustrate the inverse relationship between strip tensile strength and tear resistance which is obtained in melt-blown non-woven mats. The strip tensile strengths and tear resistances were measured for five non-woven mats that were made by melt-blowing polypropylene under essentially identical conditions (see Table I), except that the die-to-collector distance (D-C-D) was varied. The results are presented in Table III.

TABLE III

| Example No. | 16 | 17 | 18 | 19 | 20 |
|---|---|---|---|---|---|
| Mats | J | A | K | L | M |
| D-C-D (in.) | 3.0 | 4.0 | 6.0 | 8.0 | 12.0 |
| Zero Span Tensile (m) | 5830 | 6130 | 4820 | 4730 | 4730 |
| Strip Tensile (m) | 1970 | 693 | 165 | 164 | 155 |
| Tear Resistance (dm$^2$) | 62 | 103 | 212 | 261 | 409 |

While improved strip tensile strength was obtained in the as made melt-blown non-woven mat by using a short die-to-collector distance (Example 16), the tear resistance of this non-woven mat is extremely low, and conversely, as the tear resistance was improved (Example 20), the strip tensile strength became extremely low.

EXAMPLE 21

This example illustrates how the strip tensile strength of a non-woven mat is increased by fuse-bonding the mat.

Samples of non-woven mat I, made under melt-blowing conditions which produce fibers that have a diameter from about 1 to 10 microns (see Table I), were calendered once at heated calender roll temperatures ranging from 200° to 320° F. under a roller pressure of 700 pli at a line speed of 20 feet/minute, using the calender rolls of Examples 10-14. The results are tabulated in Table IV.

TABLE IV

EXAMPLE 21

| Calender Roll Temperatures | | | | | | | | | |
|---|---|---|---|---|---|---|---|---|---|
| Upper (° F.) | 70 | 200 | 225 | 250 | 275 | 287 | 300 | 310 | 320 |
| Lower (° F.) | 70 | 147 | 165 | 185 | 205 | 206 | 220 | 230 | 240 |
| Fuse-Bonded Mat Properties | | | | | | | | | |
| Strip Tensile (m) | 2346 | 2250 | 2150 | 2600 | 3100 | — | 4900 | 5600 | 5600 |
| Tear Resistance (dm$^2$) | — | — | — | — | — | — | 44 | 22 | 29 |
| Zero Span Tensile (m) | 5490 | — | — | — | — | 6560 | — | — | 7130 |

As shown by Table IV, calender roll temperatures of 250° F. or greater were effective in increasing the strip tensile strength of non-woven mat I. The lack of decrease, indeed, even an increase, of zero span tensile strength at the highest calender roll temperature as well as at an intermediate temperature shows that sufficient pressure was applied to prevent shrinkage of the fibers of the mat. Also to be noticed is the decrease in tear resistance of the non-woven mat as the strip tensile strength is improved.

That the point-bonding technique is effective to increase the strip tensile strength of other non-woven mats produced as non-woven mat I of Example 21 is illustrated by Examples 22-28.

EXAMPLES 22-28

Various non-woven mats made under melt-blowing conditions which produce fibers that have a diameter between about 1 to 10 microns (see Table I) were point-bonded at elevated temperatures to fuse-bond the fibers of the mat. The fuse-bonding was accomplished with the press and plates of Examples 1-15. The plates were heated to the temperatures set forth in Table V. The fuse-bonding was carried out for 10 seconds, with the mats being closed to a spacing of 0.005 inches between the smooth-surfaced upper plate and the lands of the projections on the lower plate. Except for Example 26, two sheets of tissue paper were used between the non-woven mats and the lower plate, and one sheet of foil was used between the non-woven mats and the upper plate. Example 26 had two sheets of foil between it and the lower plate and two sheets of foil between it and the upper plate. The point-bonded non-woven mats, as shown in Table V, exhibited high strip tensile strengths. The strip tensile strengths were greatly increased from the strip tensile strength of the untreated mat.

TABLE V

| EXAMPLE NOS. | 22 | 23 | 24 | 25 | 26 | 27 | 28 |
|---|---|---|---|---|---|---|---|
| Mats | B | C | D | K | M | N | O |
| Press Plate Temperatures | | | | | | | |
| Upper (° F.) | 280 | 290 | 280 | 275 | 260 | 275 | 280 |
| Lower (° F.) | 308 | 295 | 298 | 280 | 285 | 285 | 290 |
| Fuse-Bonded Mat Properties | | | | | | | |
| Strip Tensile (m) | 4849 | 5093 | 4975 | 4220 | 4180 | 4960 | 5720 |
| Tear Resistance (dm$^2$) | 108 | 52 | 113 | 127 | 52 | 70 | 65 |

Together, Examples 21-28 illustrate some of the strip tensile strengths which can be produced at tear resistances less than about 300 dm$^2$.

As evidenced by mats M, P and Q of Table I, melt-blown non-woven mats can be produced which have high tear resistances but low strip tensile strengths. The highly tear resistant mats made under melt-blowing conditions which produce larger diameter fibers, such as Mats P and Q, can be treated to produce non-woven mats of increased strip tensile strengths while maintaining a high mat tear resistance. To do this, the mats are fuse-bonded, either by calendering or point-bonding, at temperatures preferably no greater than 275° F., under pressures sufficient to prevent fiber shrinkage, as exemplified in Examples 29 and 30.

EXAMPLES 29-30

Samples of Mats P and Q were calendered at the temperatures and pressures set out in Table VI. Calender roll pressure was 700 pli and calender roll line speed was 20 feet/min.

TABLE VI

| EXAMPLE 29 (Mat P) | Tensile (m) | Tear (dm$^2$) | Calender Roll Temp. | |
|---|---|---|---|---|
| | | | Upper (° F.) | Lower (° F.) |
| | 858 | >1844 | 171 | 145 |
| | 1031 | 1882 | 200 | 165 |
| | 1441 | 1643 | 225 | 189 |
| | 1941 | 152 | 250 | 215 |
| EXAMPLE 30 (Mat Q) | 584 | 1304 | 70 | 70 |
| | 692 | 1303 | 100 | 85 |
| | 685 | 1592 | 125 | 47 |
| | 688 | 1170 | 150 | 114 |
| | 744 | 1000 | 175 | 130 |
| | 819 | 1010 | 200 | 147 |
| | 1020 | 252 | 225 | 165 |
| | 1335 | 91 | 250 | 185 |
| | 1489 | 42 | 275 | 205 |

The tear resistance of the as-made non-woven mats, M, P and Q, and the tear resistances of the treated non-woven mates P and Q of Examples 29 and 30 illustrate higher ranges of tear resistances which can be produced at tensile strengths less than about 2000 m.

As will now be apparent, the laminated non-woven sheets of the present invention have structural properties making them well suited for applicatons requiring both high tensile strength and high tear resistance, such as heavy duty bags and shipping sacks, carpet backing, fabric backing and other liners and clothing components, synthetic paper, wrapping materials and the like. Another special application of the laminated non-woven sheets is as battery separators. The mats are positioned between and separate the positive and negative plates in a battery. Of course, permeability of the sheet is important in batteries and thus preferably the point seal method of securing the plys together is employed or the adhesive is used in a manner not to form an impermeable barrier —such as by spaced dots of application or a thin application adhering to the fibers but not filling the interstices.

Having fully and particularly described the non-woven sheet and the processes involved in this invention and having set out the best modes thereof, it will be appreciated that alterations and changes may be made by those skilled in the art which are nevertheless within the spirit and scope of the invention, as defined by the appended claims.

I claim:

1. A process for making a strong tear-resistant, non-woven sheet battery separator having a strip tensile strength of at least 400 dm$^2$, which comprises the steps of:

a) forming at least two dissimilar non-woven mats (A) and (B) comprised of the same thermoplastic polymer fibers and made by a melt-blown process, but having major differences in tear strength and tensile strength properties; and b) laminating at least one mat (A) with at least one mat (B), wherein said mat (A) has a strip tensile strength greater than 5000 m and a tear resistance of less than 300 dm$^2$, and wherein said mat (A) has been prepared with air/polymer rates of more than 140, has a relatively high degree of self-bonding and has a fiber diameter of from 1 to 10 microns; and said mat (B) has a tear resistance of at least 1000 dm$^2$ and a tensile strength of less than 2000 m and wherein said mat (B) has been prepared with air to polymer rates of less than 50, has fiber diameters of about 10 to 40 microns and is relatively low in self-bonding but high in entanglements, wherein said mat (A) having the high strip tensile strength is obtained by heating under pressure at a temperature between about 270° to about 320° F and said mat (B) having a tear resistance at least 1000 dm$^2$ is obtained by heating under pressure at temperatures between about 200° to about 245° F.

2. A process according to claim 1 wherein said mat (A) having a high strip tensile strength is obtained by pressing it against a flat plate at temperatures between about 280° to about 300° F.

3. In a battery, a positive plate, a negative plate and a non-woven sheet of melt-blown thermoplastic fibers, said non-woven sheet positioned between and separating said positive and said negative plates and comprising a plurality of dissimilar non-woven mates laminated into said sheet, at least one of said mats (A) being comprised of fibers having diameters between 1–10 microns and having a strip tensile strength greater than 4000 m, and at least one other of said mats (B) having a tear resistance greater than 400 dm$^2$.

4. The battery of claim 3 wherein said non-woven mats (A) and (B) are comprised of fibers of the same thermoplastic polymer but having major differences in tear strength and tensile strength properties; mat (A) having a strip tensile strength greater than 5000 m and a tear resistance of less than 300 dm$^2$, having been prepared with air/polymer rates of more than 140 and having a relatively high degree of self-bonding; and mat (B) having a tear resistance of at least 1000 dm$^2$ and a tensile strength of less than 2000 m, having been prepared with air to polymer rates of less than 50, having a diameter of about 10–40 microns and being relatively low in self-bonding but high in entanglements.

5. The battery of claim 3 wherein the fibers of mat (A) are fusion-bonded.

6. The battery of claim 3 wherein mat (A) is directly laminated to mat (B) by point welding.

* * * * *